Jan. 28, 1930.   R. J. BRITTAIN, JR   1,745,321
JOURNAL BOX AND CAR FRAME SUPPORT
Filed March 21, 1928   4 Sheets-Sheet 1
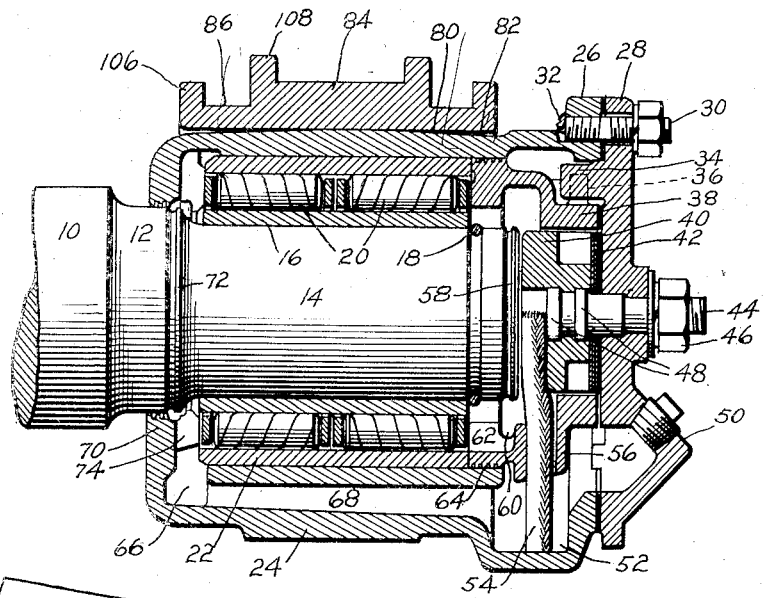
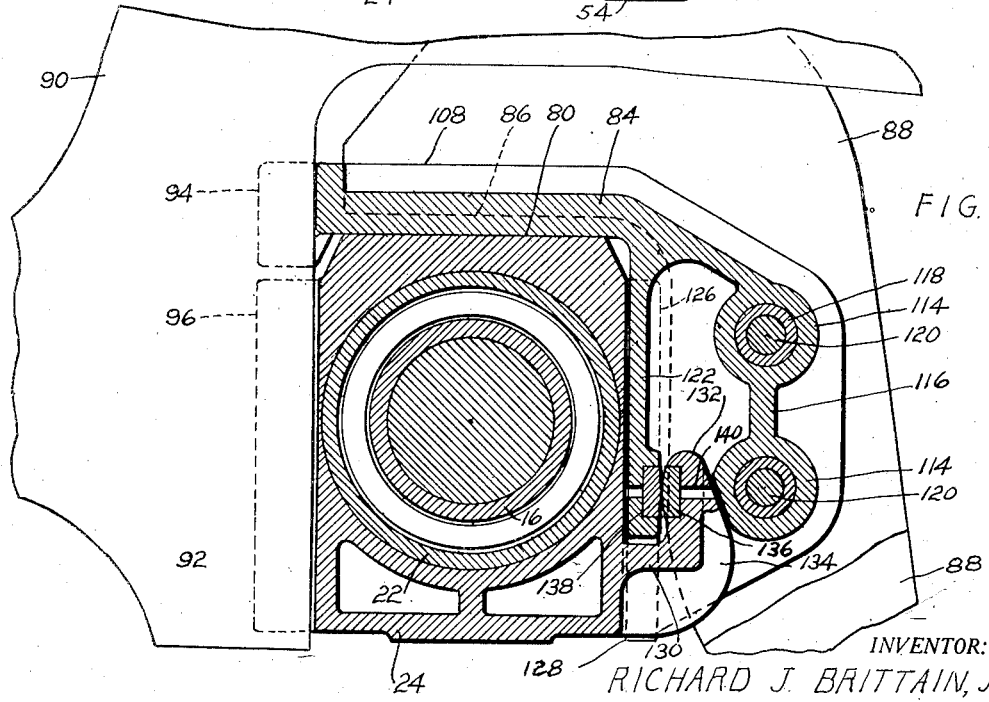
INVENTOR:
RICHARD J. BRITTAIN, JR.,
BY
HIS ATTORNEY.

INVENTOR:
RICHARD J. BRITTAIN, JR.,
BY
HIS ATTORNEY.

Jan. 28, 1930.　　R. J. BRITTAIN, JR　　1,745,321
JOURNAL BOX AND CAR FRAME SUPPORT

Filed March 21, 1928　　4 Sheets-Sheet 3

INVENTOR:
RICHARD J. BRITTAIN, JR,
BY

HIS ATTORNEY.

Jan. 28, 1930.                R. J. BRITTAIN, JR                    1,745,321
                       JOURNAL BOX AND CAR FRAME SUPPORT
                       Filed March 21, 1928         4 Sheets-Sheet 4

INVENTOR:
RICHARD J. BRITTAIN, JR.,
BY
HIS ATTORNEY.

Patented Jan. 28, 1930

1,745,321

UNITED STATES PATENT OFFICE

RICHARD J. BRITTAIN, JR., OF NEWARK, NEW JERSEY, ASSIGNOR TO GENERAL MOTORS CORPORATION, OF DETROIT, MICHIGAN, A CORPORATION OF DELAWARE

JOURNAL BOX AND CAR-FRAME SUPPORT

Application filed March 21, 1928. Serial No. 263,303.

This invention relates to journal boxes and car frame supports and comprises all the features of novelty herein disclosed. An object of the invention is to provide improved means for supporting car frame members on an axle box. Another object is to provide an adapter for connecting equalizer bars to an axle box in a manner to avoid transmission of braking stresses to the car frame. To these ends and to improve generally and in detail upon devices of this character, the invention also consists in the various matters hereinafter described and claimed.

The invention, in its broader aspects, is not necessarily limited to the specific embodiments selected for illustrative purposes in the accompanying drawings in which Fig. 1 is a longitudinal vertical section of a car axle box and associated parts.

Fig. 2 is a central cross section of Fig. 1 with portions of car parts indicated in side elevation.

Figure 3:
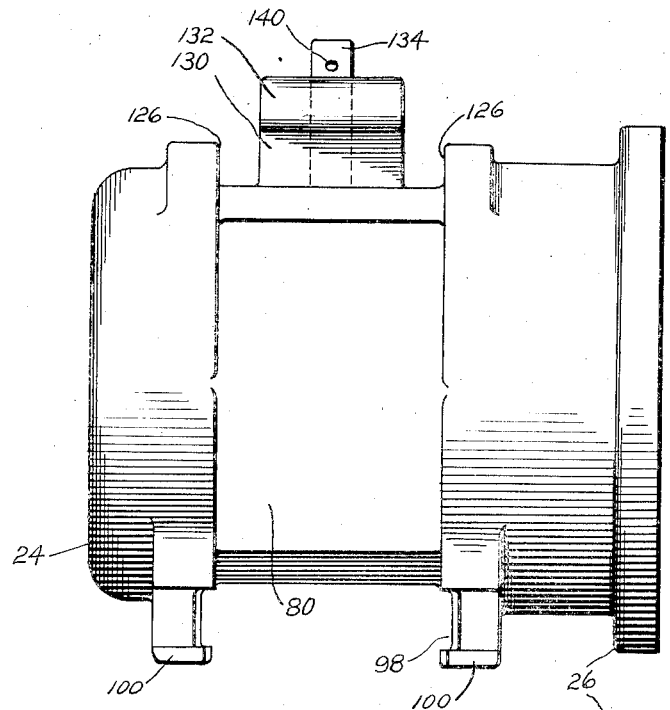
Fig. 3 is a plan view of the axle box alone.

The numeral 10 indicates a shaft or axle having cylindrical surfaces 12 and 14, the latter receiving a sleeve 16 pressed on the axle and held by a split ring 18. Roller bearings 20 are interposed between the sleeve 16 and a lining 22 inserted in the bore of an axle box or casing 24. The end of the box has an outturned flange 26 to which an end cap 28 is secured by studs 30, the studs being threaded in the flange 26 and welded as at 32. The end cap has a lug 34 projecting inwardly between spaced lugs 36 on a retainment ring 38 to hold the ring from rotation. The ring has a square opening for a square thrust block 40 and spacing plates 42 which are clamped to the end cap by a bolt 44 and nut 46. The bolt has square collars 48 around which the bronze thrust block is cast, thereby preventing the bolt from turning. Lubricant is admitted through a hollow boss 50 in the end cap to a reservoir 52 in the box and a wick 54 conveys the oil to the thrust faces afforded by the end of the axle and the adjacent opposed face of the thrust block. The wick extends through a hollow holding boss 56 on the retainment ring 38 and is secured in a recess of the thrust block in a position to rub on the axle end. Oil extracted from the wick to lubricate the thrust faces collects on a rib 58 of the axle and is thrown into an annular recess 60 of the retainment ring and drains through a notch 62 to the bearings. The retainment ring has a flange 64 with grease grooves making a close joint with the bore of the box so that the oil must traverse the bearings before returning to the reservoir through a recess 66 and inclined return passage or core 68. The rear end of the box has a flange 70 with grease grooves making a close joint with the surface 12 of the axle. Oil working inwardly along the axle is arrested by a rib 72 and is delivered to the recess 66 through a notch 74 in an annular projection of the flange 70.

Figure 4:
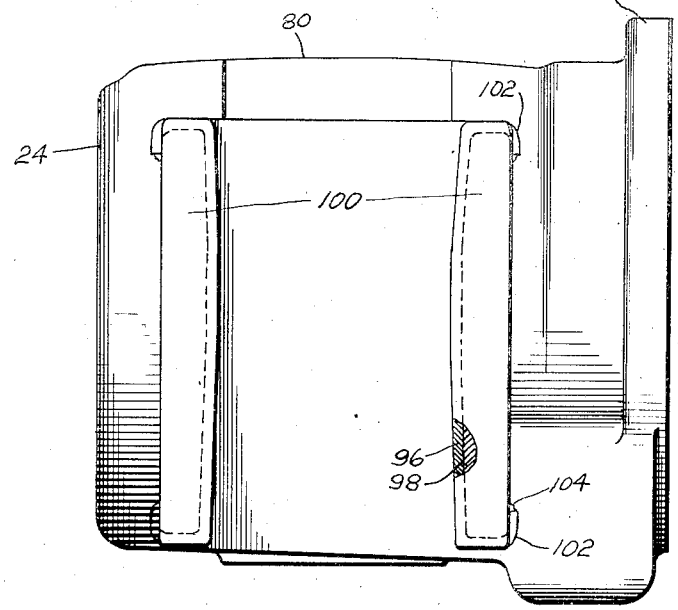
Fig. 4 is a side view of the box.
Figure 5:
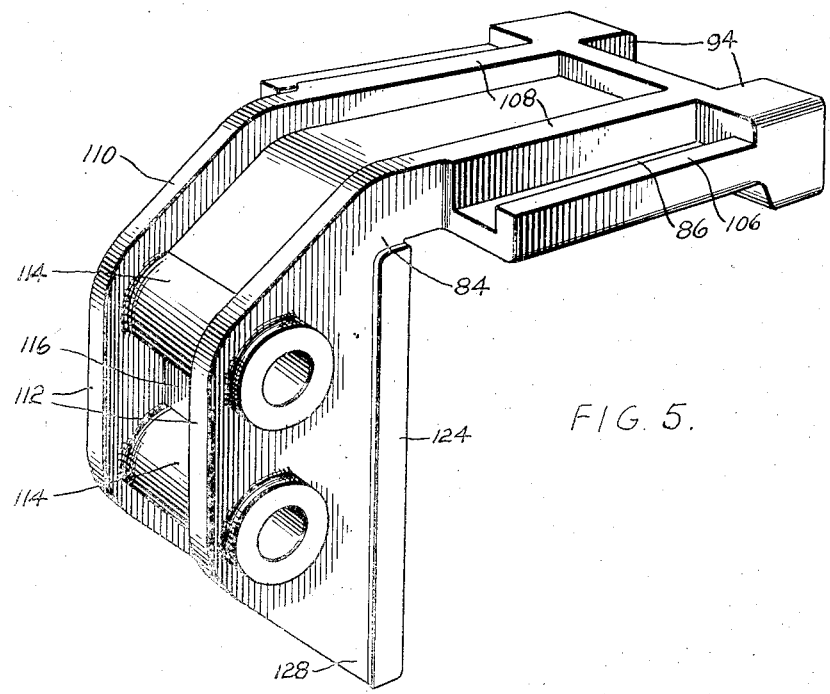
Fig. 5 is a perspective view of an adapter.
Figure 6:
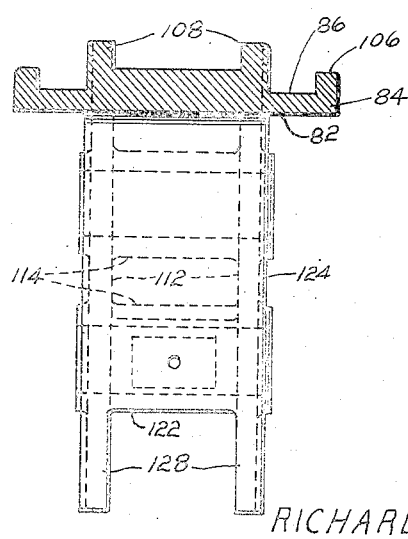
Fig. 6 is a vertical section of the top part of the adapter with the remaining portions in end elevation.

The upper face of the box is crowned longitudinally of the axle as indicated at 80, the surface preferably being cylindrical and engaging a flat face 82 on a supporting plate or adapter 84 shown in detail in Figs. 2, 5 and 6. The adapter has a horizontal seat portion with grooves or seats 86 at the sides for receiving the ends of equalizer bars 88 which are arranged in pairs straddling a truck side frame 90. The frame has at each end a pedestal 92 embraced by lugs 94 on the end of the adapter and embraced also by wear plates 96 secured in grooves or seats 98 in the adjacent faces of flanges 100 at one side of the axle box. The flanges and wear plate seats are crowned as indicated in Figs. 3 and 4 so that the box may tilt to equalize load on the bearings, the ends 102 of the wear plates being left unhardened and bent over in grooves at the upper and lower ends of the box flanges and welded at the ends to the outer walls of the flanges as indicated at 104.

The equalizer seats 86 of the adapter are formed by ribs 106 and 108, the latter slanting down at 110 and forming depending side cheeks 112 united by cylindrical bosses 114 and a web 116. The bosses receive sleeves or bushings 118 for securing bolts 120 which securely fasten the adapter between the two equalizer bars 88. The side cheeks are also united by a web 122 conforming to the flat side of the box, the outside edges 124 being embraced, with a clearance, by vertical flanges or ways 126 on the side of the box. Depending extensions 128 of the side cheeks straddle and have clearance with a projection 130 of the box, the projection extending out from the box and having an upwardly extending lug 132 and a bracing web 134. Cut in that face of the lug nearest the box is a recess receiving a crowned plate 136 engaging a flat plate 138 set in a recess in the back of the web 122. Openings 140 leading to the recesses provide for removing and replacing the plates. The contacting plates 136 and 138 transfer the pressure, due to brake reactions, from the box to the equalizer bars and remove such pressure from the truck frame pedestal 92.

Figure 7:
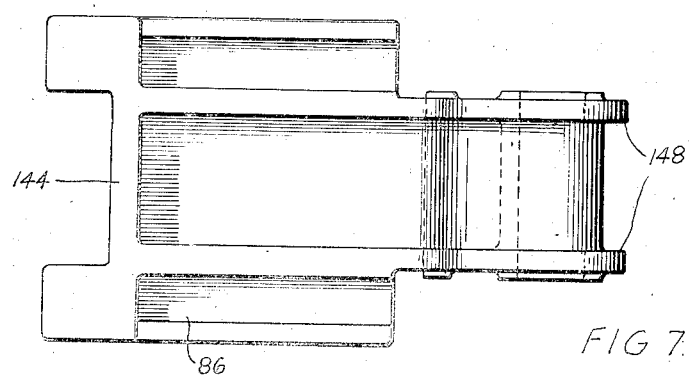
Fig. 7 is a plan view of a modified form of adapter.
Figure 8:
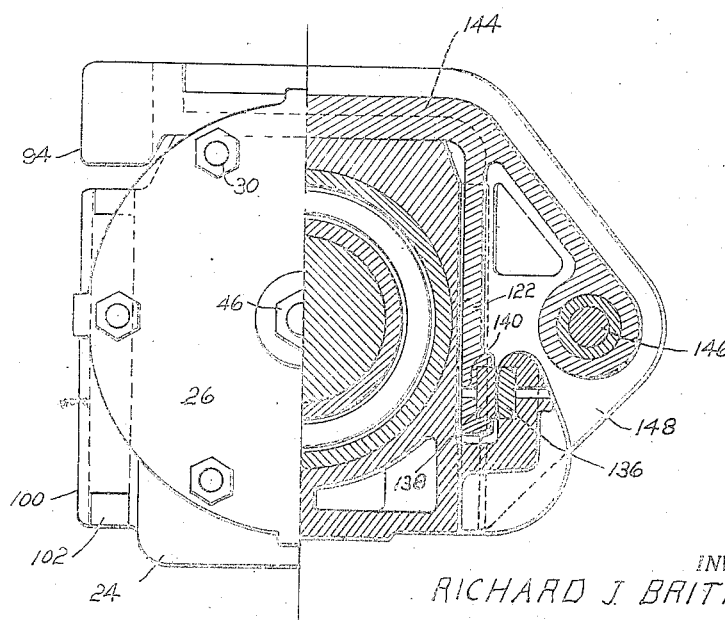
Fig. 8 is an end elevation and half section of an axle box having the adapter of Fig. 7.

In Figs. 7 and 8, the construction is similar but the adapter 144 has a single bolt 146 for connecting side cheeks 148 to equalizer bars (not shown).

I claim:

1. In a device of the character described, in combination, a journal box, a shaft journalled in the box, an adapter seated on the box to tilt longitudinally of the shaft, the adapter having seats for equalizer bars over the box, and equalizer bars resting on the adapter seats and rigidly secured to the opposite side walls of the adapter; substantially as described.

2. In a device of the character described, in combination, a journal box, a shaft journalled in the box, an adapter seated on the box to tilt longitudinally of the shaft, equalizer bars secured to the adapter, and interengaging plates between the journal box and the adapter for preventing side movement of the box; substantially as described.

3. In a device of the character described, in combination, a journal box, a shaft journalled in the box, an adapter seated on the box to tilt longitudinally of the shaft, equalizer bars secured to the adapter, a lug projecting from one side of the box, and a web on the adapter entering between the lug and the box; substantially as described.

4. In a device of the character described, in combination, a journal box, a shaft journalled in the box, an adapter seated on the box to tilt longitudinally of the shaft, equalizer bars secured to the adapter, a truck frame having a pedestal at one side of the box, and lugs on the adapter embracing the pedestal; substantially as described.

5. In a device of the character described, in combination, a journal box, a shaft journalled in the box, an adapter seated on the box to tilt longitudinally of the shaft, equalizer bars secured to the adapter, a truck frame having a pedestal at one side of the box, lugs on the adapter embracing the pedestal, and flanges projecting from the box to embrace the pedestal; substantially as described.

6. In a device of the character described, in combination, a journal box having a cylindrical seat arching longitudinally of the box, an adapter having a flat base seated on the cylindrical seat to tilt thereon with a depending portion at the side of the box, and an equalizer bar rigidly secured to the depending portion of the adapter; substantially as described.

7. In a device of the character described, in combination, a journal box having a cylindrical seat arching longitudinally of the box, an adapter having a flat base seated on the cylindrical seat to tilt thereon, the adapter having a depending portion at one side of the box, and equalizer bars secured to the sides of the depending portion; substantially as described.

8. In a device of the character described, in combination, a journal box, an adapter seated on the box and having a portion depending at one side of the box, and equalizer bars secured to the depending portion; substantially as described.

9. In a device of the character described, in combination, a journal box, an adapter seated on the box and having a portion depending at one side of the box, equalizer bars secured to the depending portion, a lug projecting from one side of the box, and side extensions on the depending portion embracing the lug; substantially as described.

10. In a device of the character described, in combination, a journal box, an adapter seated on the box and having a portion depending at one side of the box, equalizer bars secured to the depending portion, a lug projecting from one side of the box, and a web on the depending portion entering between the lug and the box; substantially as described.

11. In a device of the character described, in combination, a journal box, an adapter seated on the box, equalizer bars hung on the adapter at one side of the box, a truck frame having a pedestal at the other side of the box, and lugs on the adapter and flanges on the box embracing the pedestal; substantially as described.

12. In a device of the character described, an adapter having a horizontal portion with seats at the sides for equalizer bars, the adapter having a vertical portion comprising side cheeks and hollow connecting bosses; substantially as described.

13. In a device of the character described, an adapter having a horizontal portion with open ended seats at opposite sides for equalizer bars, and a vertical portion depending from the horizontal portion and comprising side cheeks and a flat connecting web, the cheeks being spaced apart a distance less than the seats; substantially as described.

14. In a device of the character described, an axle box having spaced flanges projecting from the side and facing one another, the flanges having grooves in their adjacent faces and in their upper and lower ends, and plates set in the adjacent grooves flush with the flanges and having their ends passed through the grooves at the ends of the flanges and bent against the outer walls of the flanges; substantially as described.

15. In a device of the character described, an adapter having a horizontal seat portion with spaced lugs at one end, and a vertical portion depending from the other end of the seat portion and having side cheeks and a connecting web; substantially as described.

16. In a device of the character described, an adapter having a horizontal portion with spaced lugs at one end and side grooves forming seats for equalizer bars, and a narrow vertical portion depending from the other end of the horizontal portion; substantially as described.

17. In a device of the character described, a journal box, a shaft journalled in the box, a frame having a pedestal at one side of the box, frame supporting members mounted on the box, and means for transmitting braking stresses in two directions from one side of the box directly to the supporting members independently of the pedestal; substantially as described.

18. In a device of the character described, a journal box, a shaft journalled in the box, a frame having a pedestal at one side of the box, a frame supporting equalizer bar supported by the box, and means for transmitting stresses in two directions from one side of the box to the equalizer bar independently of the pedestal; substantially as described.

19. In a device of the character described a journal box, a shaft journalled in the box, a frame having a pedestal at one side of the box, an adapter seated on the box, a frame supporting equalizer bar rigidly connected to the adapter, and means for transmitting stresses in two directions from the box to the adapter independently of the pedestal; substantially as described.

20. In a device of the character described, a journal box, a shaft journalled in the box, an adapter supported on the box and having a depending extension at one side of the box, an equalizer bar rigidly secured to the depending portion of the adapter, and means for transmitting stresses in two directions from one side of the box to the depending portion of the adapter; substantially as described.

In testimony whereof I hereunto affix my signature.

RICHARD J. BRITTAIN, Jr.

CERTIFICATE OF CORRECTION.

Patent No. 1,745,321.  Granted January 28, 1930, to

RICHARD J. BRITTAIN, JR.

It is hereby certified that error appears in the printed specification of the above numbered patent requiring correction as follows: Page 3, line 22, claim 14, after the word "grooves" insert the word "substantially"; and that the said Letters Patent should be read with this correction therein that the same may conform to the record of the case in the Patent Office.

Signed and sealed this 25th day of February, A. D. 1930.

(Seal)

M. J. Moore,
Acting Commissioner of Patents.